(12) United States Patent
Takeuchi

(10) Patent No.: US 9,995,361 B2
(45) Date of Patent: Jun. 12, 2018

(54) DAMPER

(71) Applicant: KYB Corporation, Tokyo (JP)

(72) Inventor: Hideaki Takeuchi, Gifu (JP)

(73) Assignee: KYB Corporation, Tokyo (JP)

( * ) Notice: Subject to any disclaimer, the term of this patent is extended or adjusted under 35 U.S.C. 154(b) by 0 days. days.

(21) Appl. No.: 15/304,881

(22) PCT Filed: May 14, 2015

(86) PCT No.: PCT/JP2015/063929
§ 371 (c)(1),
(2) Date: Oct. 18, 2016

(87) PCT Pub. No.: WO2015/178285
PCT Pub. Date: Nov. 26, 2015

(65) Prior Publication Data
US 2017/0138432 A1  May 18, 2017

(30) Foreign Application Priority Data

May 19, 2014 (JP) ................ 2014-103011

(51) Int. Cl.
| F16F 9/36 | (2006.01) |
| F16F 9/32 | (2006.01) |
| F16F 13/04 | (2006.01) |
| B60G 15/06 | (2006.01) |
| F16F 9/58 | (2006.01) |
| F16F 9/06 | (2006.01) |

(52) U.S. Cl.
CPC ............. *F16F 9/362* (2013.01); *B60G 15/06* (2013.01); *F16F 9/3235* (2013.01); *F16F 9/585* (2013.01);
(Continued)

(58) Field of Classification Search
CPC .. F16F 9/362; F16F 13/04; F16F 9/585; F16F 9/061; F16F 9/3235; F16F 9/065; B60G 15/06; B60G 2800/162; B60G 2206/41
(Continued)

(56) References Cited

U.S. PATENT DOCUMENTS 3,104,916 A * 9/1963 Dowling ................ F16F 9/362
188/322.17
3,804,217 A * 4/1974 Keijzer .................. F16F 9/363
188/322.17
(Continued)

FOREIGN PATENT DOCUMENTS

| JP | 2005-016721 A | 1/2005 |
| JP | 2007-064379 A | 3/2007 |
| JP | 2009-036259 A | 2/2009 |

*Primary Examiner* — Thomas J Williams
*Assistant Examiner* — Mariano Sy
(74) *Attorney, Agent, or Firm* — Rabin & Berdo, P.C.

(57) ABSTRACT

A damper includes a cylinder, an annular rod guide, an annular seat, a rod, an annular oil seal, a rebound cushion, and a communication passage. The cylinder houses an action chamber. The rod guide is secured to one side opening of the cylinder. The seat is secured to the rod guide. The rod is inserted through inner peripheral sides of the rod guide and the seat. The oil seal is held to an inner periphery of the rod guide and slidably in contact with an outer peripheral surface of the rod. The rebound cushion bumps against the seat. The communication passage transmits a pressure in the action chamber to the oil seal. An opening on the communication passage on the action chamber side is disposed on an outer peripheral side relative to a part of the seat against which the rebound cushion bumps.

12 Claims, 5 Drawing Sheets

(52) U.S. Cl.
CPC .......... *F16F 13/04* (2013.01); *B60G 2206/41* (2013.01); *B60G 2800/162* (2013.01); *F16F 9/061* (2013.01); *F16F 9/065* (2013.01)

(58) Field of Classification Search
USPC .................. 188/322.17, 322.16, 322.22
See application file for complete search history.

(56) References Cited

U.S. PATENT DOCUMENTS

| | | | |
|---|---|---|---|
| 3,837,445 A * | 9/1974 | Pierle .................... | F16F 9/3484 137/513.7 |
| 5,115,892 A * | 5/1992 | Yamaoka ............... | F16F 9/364 188/280 |
| 5,810,130 A * | 9/1998 | McCandless ........... | F16F 9/585 188/322.15 |
| 5,896,960 A * | 4/1999 | Ananthanarayanan | B23K 9/007 188/321.11 |
| 7,182,190 B2 * | 2/2007 | Asadi ...................... | F16F 9/585 188/322.18 |
| 8,109,491 B2 * | 2/2012 | Handke ................... | F16F 9/585 188/266 |
| 9,683,624 B2 * | 6/2017 | Lehnen ................. | F16F 9/3242 |
| 2005/0218574 A1 * | 10/2005 | Nishimura ........... | B60G 15/063 267/220 |
| 2017/0037922 A1 * | 2/2017 | Takeuchi ................. | F16F 9/36 |
| 2017/0074344 A1 * | 3/2017 | Takeuchi ................. | F16F 9/32 |

* cited by examiner

DAMPER

TECHNICAL FIELD

The present invention relates to a damper.

BACKGROUND ART

A damper is used to damp vibrations of, for example, a vehicle, a device, and a construction. For example, a damper disclosed in U.S. Pat. No. 3,837,445B includes a cylinder, an annular rod guide, an annular seat, a rod, an annular oil seal, and an annular seal holder. The cylinder internally forms an action chamber. The rod guide is secured to an upper opening of this cylinder. The seat is disposed on the action chamber side of this rod guide. The rod is inserted through insides of the rod guide and the seat so as to be axially movable. The oil seal is held to an inner periphery of the rod guide to seal an outer periphery of the rod. The seal holder is interposed between the rod guide and the seat and disposed on an outer periphery of the oil seal.

The seal holder is made of an elastic body such as rubber. The seal holder elastically supports an outer periphery of a lip portion of the oil seal to enhance a sealing property (performance of sealing) with the oil seal. The seal holder closely contacts an inner peripheral surface of the cylinder to seal an inner periphery of the cylinder. The seat includes a communication passage that axially penetrates this seat. Through a transmission of a pressure in the action chamber via this communication passage to the oil seal via the seal holder also allows enhancing the sealing property with this oil seal.

In details, when the seal holder receives the pressure in the action chamber via the communication passage, the seal holder is pressed to the rod guide and is compressed. This strengthens a force of fastening the lip portion of the oil seal with the seal holder. This ensures strongly pressing the lip portion to the outer peripheral surface of the rod, enhancing the sealing property with the oil seal.

SUMMARY OF INVENTION

For example, as disclosed in JP2007-64379A, the use of the above-described conventional seal holder of the damper as a rebound cushion that reduces an impact while the damper extends the most, a deterioration in the sealing property of the seal holder is apprehended. In view of this, as described in paragraph 0028 in JP2005-16721A, it is preferable to install a rebound cushion made of an elastic body such as rubber to an outer periphery of a rod inserted into a cylinder. Thus, while the damper extends the most, this rebound cushion bumps against a seat and is elastically deformed, reducing the impact at the most extension.

However, like the conventional damper, in the case where the communication passage is formed of a hole penetrating the seat axially, bringing the rebound cushion into contact with an edge of the hole possibly cuts the rebound cushion by this edge on the hole.

Therefore, an object of the present invention is to provide a damper where a communication passage passes through a seat that ensures stretching a rebound cushion even if the rebound cushion installed to an outer periphery of a rod bumps against the seat.

A damper according to one aspect of the present invention includes a cylinder, an annular rod guide, an annular seat, a rod, an annular oil seal, a rebound cushion, and a communication passage. The cylinder internally forms an action chamber. The rod guide is secured to one side opening of the cylinder. The seat is secured to the rod guide on the action chamber side. The rod is inserted through inner peripheral sides of the rod guide and the seat so as to be axially movable. The oil seal is held to an inner periphery of the rod guide. The oil seal is slidably in contact with an outer peripheral surface of the rod. The rebound cushion is installed to an outer periphery of the rod inserted into the cylinder. The rebound cushion bumps against the seat at a most extension. The communication passage transmits a pressure in the action chamber to the oil seal. An opening on the communication passage on the action chamber side is disposed on an outer peripheral side relative to a part of the seat against which the rebound cushion bumps.

DESCRIPTION OF EMBODIMENTS

Figure 1:
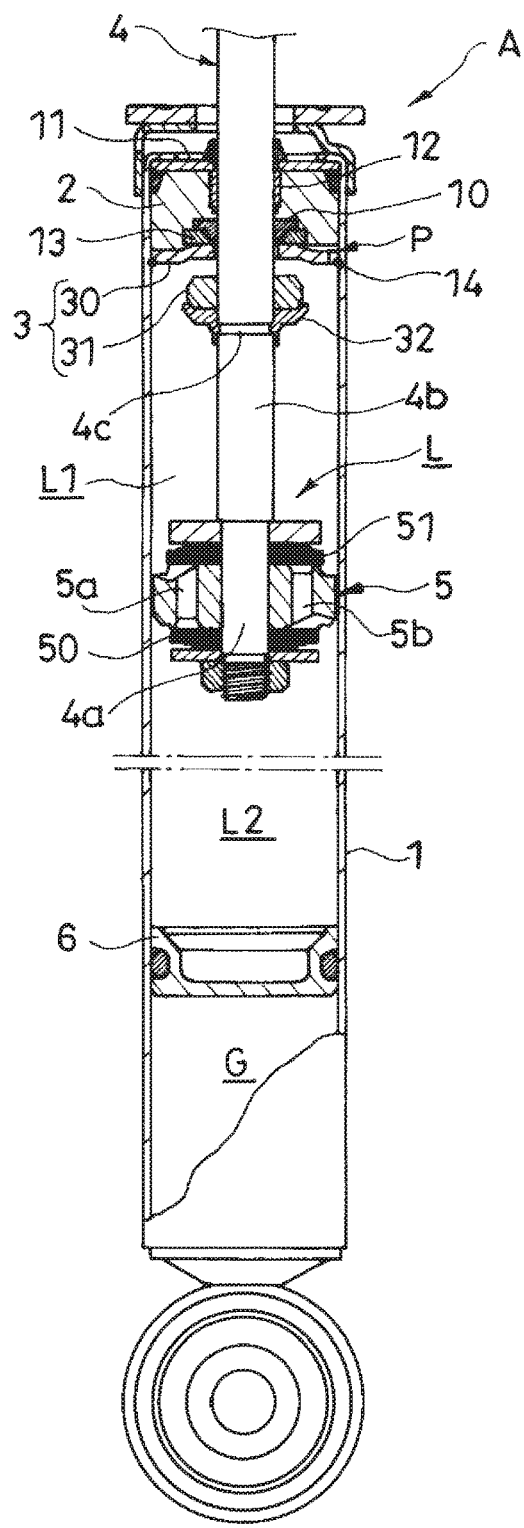
FIG. 1 is a front view partially taking a cross section of a damper according to an embodiment of the present invention.

The following describes a damper according to one embodiment of the present invention with reference to the drawings. Like reference numerals designate corresponding or identical elements throughout some drawings.

Figure 2:
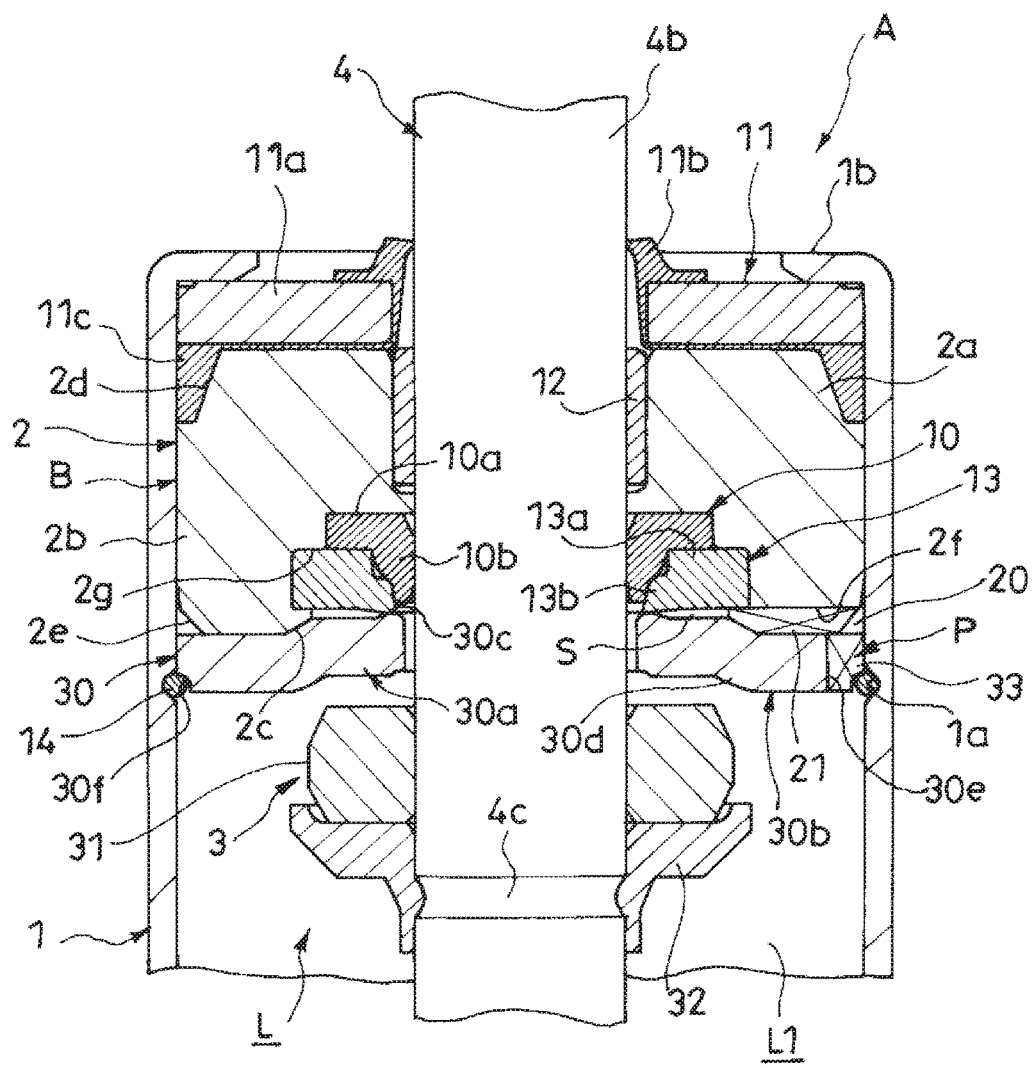
FIG. 2 is a drawing illustrating enlarged main parts in FIG. 1.

As illustrated in FIG. 1 and FIG. 2, a damper A according to the embodiment includes a cylinder 1, an annular rod guide 2, an annular seat 30, a rod 4, an annular oil seal 10, a rebound cushion 31, and a communication passage P. The cylinder 1 internally forms an action chamber L. The rod guide 2 is secured to one side opening of this cylinder 1. The seat 30 is secured to this rod guide 2 on the action chamber L side. The rod 4 is inserted through inner peripheral sides of the rod guide 2 and the seat 30 so as to be axially movable. The oil seal 10 is held to an inner periphery of the rod guide 2 and slidably in contact with an outer peripheral surface of the rod 4. The rebound cushion 31 is installed to an outer periphery of the rod 4 inserted into the cylinder 1 and bumps against the seat 30 at the most extension. The communication passage P transmits a pressure in the action chamber L to the oil seal 10. An opening on the communication passage P on the action chamber L side is disposed on an outer peripheral side relative to a part of the seat 30 against which the rebound cushion 31 bumps.

The following gives the description in detail. The damper A according to the embodiment is used for a vehicle such as an automobile. Especially, when used for the vehicle, the cylinder 1 is coupled to a wheel side, and a projecting end portion of the rod 4, which projects from the cylinder 1, is coupled to a vehicle body side. Especially, the damper A is disposed at the vehicle so as to erect. Accordingly, when an impact due to uneven road surface is input to the wheel, the rod 4 moves into and out of the cylinder 1, thus the entire damper A extends and contracts.

It should be noted that, the damper A may be used for a vehicle other than the automobile, a device, a construction, and a similar structure. The damper A may be disposed at the vehicle so as to stand upside-down where the cylinder 1 is coupled to the vehicle body side and the rod 4 is coupled to the wheel side.

As illustrated in FIG. 1, the embodiment forms the cylinder 1 with a shape of a cylinder with a closed bottom. The annular rod guide 2 is secured to the upper opening of this cylinder 1. Furthermore, the rod 4 penetrates the rod guide 2 and moves into and out of the cylinder 1. Furthermore, the damper A includes a piston 5, a free piston 6, and a rebound member 3. The piston 5 is held to a lower end portion of the rod 4 and slidably in contact with the inner peripheral surface of the cylinder 1. The free piston 6 is slidably in contact with the inner peripheral surface on a side opposite from the rod on the cylinder 1. The rebound member 3 reduces an impact while the damper A extends the most. The free piston 6 partitions the cylinder 1 into the above-described action chamber L filled with hydraulic oil and a gas chamber G that seals gas.

The gas chamber G swells and contracts through a movement of the free piston 6 in an axial (vertical) direction. This can compensate for a change in an inner volume of the cylinder by a volume of an appearance of the rod 4 in association with extending and contracting the damper A and a change in volume of the hydraulic oil due to temperature change.

In detail, during the extension operation of the damper A where the rod 4 moves out of the cylinder 1, the free piston 6 moves upward and the gas chamber G enlarges. This ensures compensating for an increase in cylinder inner volume by the volume of the rod 4 moving out with the gas chamber G. Inversely, during the compression operation of the damper A where the rod 4 moves into the cylinder 1, the free piston 6 moves downward and the gas chamber G contracts. This ensures compensating for the reduction in cylinder inner volume by the volume of the rod 4 moving into with the gas chamber G. In the case where the volume of hydraulic oil expands due to a temperature rise, the free piston 6 moves downward and the gas chamber G contracts. In the case where the volume of hydraulic oil contracts due to a temperature reduction, the free piston 6 moves upward and the gas chamber G enlarges.

It should be noted that, the damper A according to the embodiment includes the gas chamber G configured to be a mono-tube type. However, instead of the gas chamber G, a reservoir may be disposed outside the cylinder 1 to seal the hydraulic oil and the gas, and the reservoir may compensate for the change in cylinder inner volume and the change in volume of the hydraulic oil. Especially, in this case, an outer pipe may be disposed on an outer periphery of the cylinder 1 to configure the damper A as a twin-tube type, and the reservoir may be formed between the cylinder 1 and the outer pipe. The liquid filling the action chamber L may be other than the hydraulic oil. As long as a damping force can be generated, the liquid can be appropriately changed.

The action chamber L is partitioned into an extension-side chamber L1, which is on the rod 4 side across the piston 5 (upward in the drawing) and a contraction-side chamber L2, which is on a side opposite from the rod 4 across the piston 5 (downward in the drawing). The piston 5 forms an extension-side passage 5a and a contraction-side passage 5b, which communicate between the extension-side chamber L1 and the contraction-side chamber L2. A lower-portion-side leaf valve 50 to open and close the extension-side passage 5a is stacked on a lower portion side of the piston 5. An upper-portion-side leaf valve 51 to open and close the contraction-side passage 5b is stacked on an upper portion side of the piston 5.

The lower-portion-side leaf valve 50 functions as an extension-side damping valve that opens the extension-side passage 5a only during the extension operation of the damper A and provides a resistance to a flow of the hydraulic oil passing through this extension-side passage 5a. Meanwhile, the upper-portion-side leaf valve 51 functions as a contraction-side damping valve that opens the contraction-side passage 5b only during the compression operation of the damper A and provides a resistance to a flow of the hydraulic oil passing through this contraction-side passage 5b.

With the configuration, during the extension operation of the damper A, the hydraulic oil in the contracted extension-side chamber L1 opens the lower-portion-side leaf valve 50, passes through the extension-side passage 5a, and moves to the enlarged contraction-side chamber L2. Accordingly, the damper A generates an extension-side damping force caused by the resistance of the lower-portion-side leaf valve 50 when the hydraulic oil passes through the extension-side passage 5a. Inversely, during the compression operation of the damper A, the hydraulic oil in the contracted contraction-side chamber L2 opens the upper-portion-side leaf valve 51, passes through the contraction-side passage 5b, and moves to the enlarged extension-side chamber L1. Accordingly, the damper A generates a contraction-side damping force caused by the resistance of the leaf valve 51 when the hydraulic oil passes through the contraction-side passage 5b.

It should be noted that, in the embodiment, the damper A is configured to generate the damping forces on the extension side and the contraction side caused by the resistances of the leaf valves 50 and 51. However, the configuration to provide the resistance to the flow of the hydraulic oil moving between the extension-side chamber L1 and the contraction-side chamber L2 can be appropriately changed. For example, poppet valves, orifices, and similar members may substitute for the leaf valves 50 and 51. In this embodiment, since the leaf valve 50, which generates the damping force on the extension side, and the leaf valve 51, which generates the damping force on the contraction side, are separated, this allows individually setting the damping forces on the extension side and the contraction side. However, one valve may be configured to generate the damping forces both on the extension side and the contraction side.

The rod 4 coupled to the piston 5 includes a mounting portion 4a and a shaft portion 4b. The mounting portion 4a with small diameter holds the piston 5 to its outer periphery. The shaft portion 4b extends upward from this mounting portion 4a, penetrates the extension-side chamber L1, and projects to the outside of the cylinder 1. An annular groove 4c is formed on an outer periphery of the shaft portion 4b along a circumferential direction in the cylinder 1. An annular stopper 32 is fitted to this groove 4c. To the annular stopper 32, an annular rebound cushion 31 is supported. This rebound cushion 31 is made of an elastic body such as rubber and constitutes the rebound member 3 together with a seat 30, which will be described later. Furthermore, the rebound cushion 31 bumps against the seat 30 when the damper A extends the most and elastically deforms to reduce an impact at the most extension.

Figure 3:
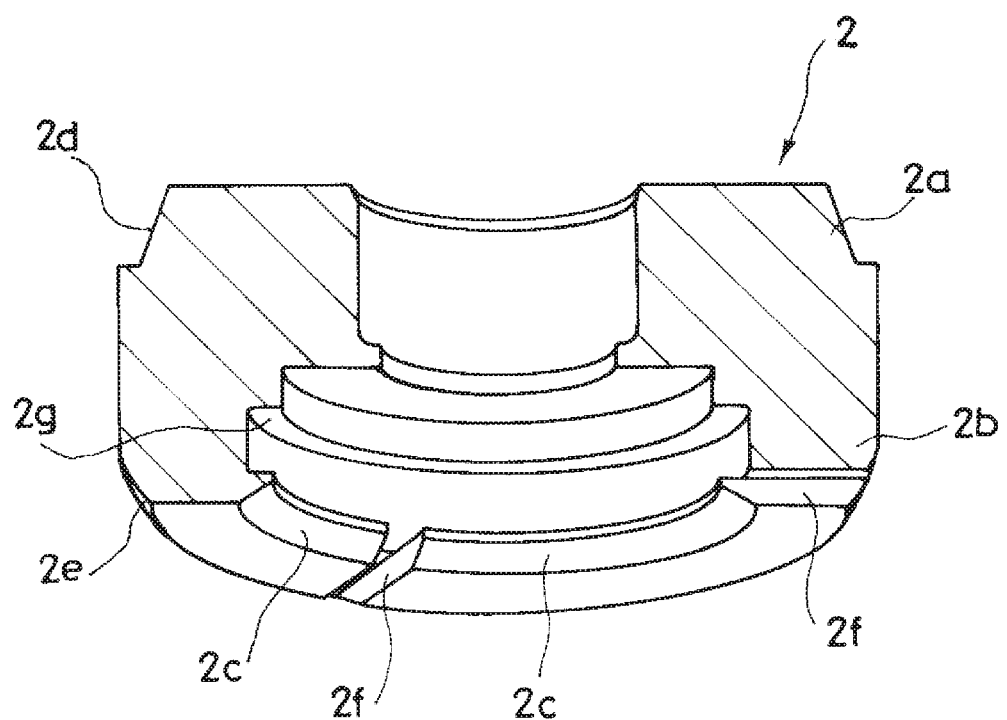
FIG. 3 illustrates an enlarged perspective view of a vertically cut-off rod guide of the damper according to the embodiment of the present invention.

The shaft portion 4b of the rod 4 penetrates the annular rod guide 2 secured to the upper opening of the cylinder 1. As illustrated in FIG. 2 and FIG. 3, this rod guide 2 includes an annular main body 2a, an annular case 2b, and arc-shaped claws 2c. The case 2b is continuous with the lower portion of this main body 2*a*. The claw 2*c* projects out from an inner periphery of the lower end portion of this case 2*b* to a center side in a cylinder radial direction. The main body 2*a* is formed into an approximately truncated cone shape. An outer periphery of the main body 2*a* is formed as an inclined surface 2*d* inclined such that the diameter gradually decreases toward the upper end. The lower portion of the case 2*b* is formed into an approximately truncated cone shape. An outer periphery of the case 2*b* is formed as an inclined surface 2*e* inclined such that the diameter gradually decreases toward the lower end. That is, the inclined surface 2*e* inclines in the inverse direction to the inclined surface 2*d*. Furthermore, at a lower portion of the case 2*b*, a bottom groove 2*f* is formed along the cylinder radial direction from the outer peripheral end to the inner peripheral end. This bottom groove 2*f* is formed as a clearance (an opening) between the adjacent claws 2*c*.

As illustrated in FIG. 2, a sealing member 11 to seal the outer periphery of the rod 4 and the inner periphery of the cylinder 1 is stacked on the upper portion of the main body 2*a* in the rod guide 2. An annular bearing 12 is fitted to the inner periphery of the main body 2*a* to movably journal the rod 4 in the axial direction. Meanwhile, to the inner periphery of the case 2*b*, an oil seal 10 to seal an outer periphery of the rod 4 and a seal holder 13 are held. The annular seat 30 is stacked on the lower portion of the case 2*b* (the operation chamber L side).

The rod guide 2, the bearing 12, the oil seal 10, and the seal holder 13 can be integrally assembled in advance to avoid mutual separation. Thus, these members constitute a rod guide assembly B. A groove 1*a* is formed along the circumferential direction on the inner periphery of the cylinder 1. A retaining ring 14 is fitted to this groove 1*a*. The seat 30, the rod guide assembly B, and the sealing member 11 are stacked in this order on the upper portion of the retaining ring 14, which projects from the inner peripheral surface of the cylinder 1. Crimping an upper end portion 1*b* of the cylinder 1 to the inside secures the stacked seat 30, rod guide assembly B, and sealing member 11 to the upper opening of the cylinder 1.

It should be noted that, a method for installing the seat 30, the rod guide assembly B, and the sealing member 11 to the cylinder 1 can be appropriately changed. For example, a part corresponding to the groove 1*a* may be projected to the inner peripheral side by roll crimping, and the seat 30 may be hooked to this protrusion.

The sealing member 11, which is stacked on the upper portion of the main body 2*a*, is constituted of an annular plate-shaped insert metal 11*a* and a rubber portion (not indicated by reference numeral), which coats this insert metal 11*a*. This rubber portion is constituted of an annular dust seal 11*b* and an annular outer peripheral seal 11*c*. The dust seal 11*b* extends from the inner peripheral portion of the insert metal 11*a* to upward, with being inclined. The outer peripheral seal 11*c* extends from the outer peripheral portion of the insert metal 11*a* to downward. The dust seal 11*b* is slidably in contact with the outer peripheral surface of the shaft portion 4*b* of the rod 4 to seal the outer periphery of the rod 4, thus preventing a foreign matter from an external air side from mixing into the cylinder 1. Meanwhile, the outer peripheral seal 11*c* closely contacts the inclined surface 2*d* on the rod guide 2 and the inner peripheral surface of the cylinder 1 to prevent the hydraulic oil in the cylinder 1 from leaking to the external air side.

An annular stepped surface 2*g* is formed at the inner periphery of the case 2*b* in the rod guide 2. An inner diameter of the case 2*b* above this stepped surface 2*g* is configured smaller than an inner diameter of the case 2*b* below the stepped surface 2*g*. The annular oil seal 10 is inserted into the upper portion of the stepped surface 2*g* in the case 2*b*. The annular seal holder 13 is press-fitted to the lower portion of the stepped surface 2*g* in the case 2*b*. The oil seal 10 is made of fluorine-containing rubber (FKM) and includes an annular base portion 10*a* and an annular lip portion 10*b*. The lip portion 10*b* inclinedly extends from the inner periphery of this base portion 10*a* to downward. A slidable contact of this lip portion 10*b* with the outer peripheral surface of the shaft portion 4*b* of the rod 4 seals the outer periphery of the rod 4, thus preventing the hydraulic oil in the cylinder 1 from leaking to the external air side. Meanwhile, the seal holder 13 is made of nitrile rubber (NBR) and includes an annular press-fitted portion 13*a* and an annular supporting portion 13*b*. The supporting portion 13*b* extends from the lower inner periphery of this press-fitted portion 13*a* toward the center side in the cylinder radial direction. This press-fitted portion 13*a* presses the base portion 10*a* of the oil seal 10, thus retaining the oil seal 10. The supporting portion 13*b* elastically supports the outer periphery of the lip portion 10*b*.

It should be noted that, materials and shapes of the oil seal 10 and the seal holder 13 can be appropriately changed. With the embodiment, the oil seal 10 is separated from the dust seal 11*b* and is disposed on the action chamber L side with respect to the bearing 12. In view of this, even if a foreign matter passes through the dust seal 11*b*, the bearing 12 can also restrain the movement of this foreign matter to the action chamber L side. Therefore, the foreign matter is difficult to reach the oil seal 10, thus restraining a damage in the oil seal 10 by the foreign matter and ensuring improving a period of the use of the oil seal 10. The oil seal 10 is slidably in contact with an outer peripheral surface of a part between the piston 5 and the bearing 12 in the rod 4. This part is a part less likely to deflect even if an external force acts sideways on the rod 4. Therefore, the lip portion 10*b* of the oil seal 10 is less likely to be separate from the outer peripheral surface of the rod 4, ensuring an excellent sealing property with the oil seal 10. Further, the oil seal 10 is separated from the dust seal 11*b* to be different bodies; therefore, to form these members, materials appropriate for the respective members are easily selected.

The three arc-shaped claws 2*c* are arranged on the identical circumference in the rod guide 2. A diameter of a circle connecting inner peripheral ends of these claws 2*c* is formed smaller than an inner diameter of the case 2*b* lower than the stepped surface 2*g* and is formed larger than an inner diameter of the case 2*b* upper than the stepped surface 2*g*. Accordingly, to insert the oil seal 10 into the case 2*b*, the oil seal 10 is not hooked to the claws 2*c*. Subsequent to the oil seal 10, fitting the elastically deformed seal holder 13 to the upper side of the claws 2*c* retains the seal holder 13 with the claws 2*c*.

As described above, the press-fitted portion 13*a* of the seal holder 13 presses the base portion 10*a* of the oil seal 10. Thus, the oil seal 10 is configured so as not to come off from the case 2*b* as long as the seal holder 13 does not come off. This ensures retaining both the oil seal 10 and the seal holder 13 with the claws 2*c*. The lower surfaces of the claws 2*c* are tapered inclining upward to the center side in the cylinder radial direction; therefore, the seal holder 13 elastically deforms while guided by these tapers. This easily fits the seal holder 13 to the upper sides of the claws 2*c*.

It should be noted that, the shape, the number, and the arrangement of the claws 2*c* can be appropriately changed. For example, the claw 2*c* may be formed into an annular shape, and the bottom groove 2f may extend up to the inner peripheral end of the claw 2c.

Figure 4:
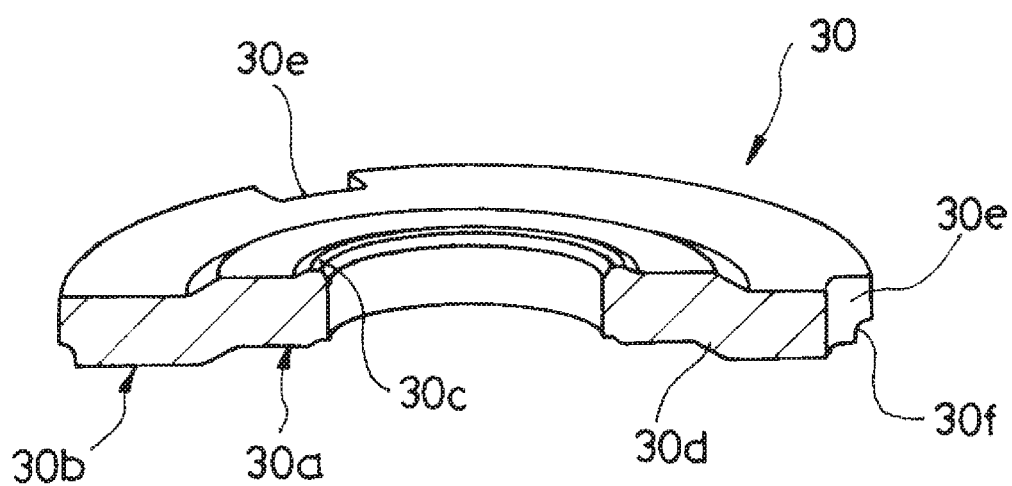
FIG. 4 illustrates an enlarged perspective view of a vertically cut-off seat of the damper according to the embodiment of the present invention.

The shaft portion 4b of the rod 4 is inserted through the inside of the annular seat 30 stacked on the lower side of the rod guide 2. As described above, the seat 30 constitutes the rebound member 3 together with the rebound cushion 31. As illustrated in FIG. 2 and FIG. 4, this seat 30 includes an annular plate-shaped butting portion 30a against which the rebound cushion 31 bumps and an annular plate-shaped seat portion 30b, which is disposed on the outer peripheral side of this butting portion 30a.

In the embodiment, an inner peripheral part 30c of the butting portion 30a slightly bulges upward and is brought into contact with a lower surface on the inner peripheral portion of the supporting portion 13b in the seal holder 13. It should be noted that, since the bulging of the inner peripheral part 30c of the butting portion 30a is gradual, even if the rebound cushion 31 collides with the butting portion 30a, it is arranged that the level difference in the butting portion 30a does not damage the rebound cushion 31. The butting portion 30a slightly bulges from the seat portion 30b and inclines such that an outer peripheral portion 30d of the butting portion 30a goes along the taper of the claw 2c.

The seat portion 30b is brought into contact with a lower end surface of the case 2b in the rod guide 2. On the outer peripheral portion of the seat portion 30b, a plurality of cutouts 30e are circumferentially arranged. Furthermore, a hook groove 30f hooked to the retaining ring 14 is formed at the lower portion of the seat portion 30b. As illustrated in FIG. 2, the cutouts 30e are opposed to the inclined surface 2e formed on the lower outer periphery of the case 2b.

A communication passage P is constituted of a vertical passage 33, an annular passage 20, a lateral passage 21, and a clearance (not indicated by reference numeral). The vertical passage 33 is formed between the cutouts 30e and the cylinder 1. The annular passage 20 is formed between the inclined surface 2e and the cylinder 1. The lateral passage 21 is formed between the bottom groove 2f and the seat portion 30b of the seat 30. The clearance is formed between the claw 2c and the claw 2c. In the embodiment, this communication passage P communicates between the action chamber L and a clearance S formed between the seal holder 13 and the butting portion 30a of the seat 30 to transmit a pressure in the action chamber L to the oil seal 10.

In detail, the above-described communication passage P communicates between the clearance S, which is formed between the seal holder 13 and the seat 30, and the action chamber L. Accordingly, pressurizing the action chamber L by compressing and sealing the gas in the gas chamber G also pressurizes the clearance S. This pressure compresses the seal holder 13. This compression reduces the diameter of the supporting portion 13b of the seal holder 13 and the force of fastening the lip portion 10b of the oil seal 10 strengthens. That is, the pressure in the action chamber L is caused to act on the oil seal 10 via the communication passage P, the clearance S, and the seal holder 13 to strengthen the force of pressing the lip portion 10b of this oil seal 10 to the outer peripheral surface of the rod 4, thus ensuring enhancing the sealing property with the oil seal 10.

In the embodiment, the bottom groove 2f and the clearance formed between the claw 2c and the claw 2c are disposed on the identical straight line, and these bottom groove 2f and clearance are circumferentially disposed at regular intervals, thereby ensuring applying a uniform pressure to the seal holder 13. However, the configuration of the communication passage P can be appropriately changed.

The following describes operations of the damper A according to the embodiment.

The rebound cushion 31 is held to the outer periphery of the rod 4. In association with extending and contracting damper A, the rebound cushion 31 moves relative to the seat 30 secured to the cylinder 1 side. In association with the extension operation of the damper A, the rebound cushion 31 approaches the seat 30 and is sandwiched between the seat 30 and the stopper 32 and elastically deforms at the most extension, thus reducing the impact at the most extension.

While this damper A extends the most, the rebound cushion 31 collides with the butting portion 30a of the seat 30 and does not overlap the cutouts 30e, which serve as the openings on the communication passage P on the action chamber L side. This does not damage the rebound cushion 31 by edges of these cutouts 30e and even if the communication passage P passes through the seat 30, this ensures stretches the rebound cushion 31. In the embodiment, the communication passage P includes the annular passage 20. This eliminates the need for matching positions of the bottom grooves 2f with the cutouts 30e, easing the assembly of the damper A.

The following describes operational advantages of the damper A according to the embodiment.

In the embodiment, the dust seal 11b is integrated with the outer peripheral seal 11c.

Figure 5:
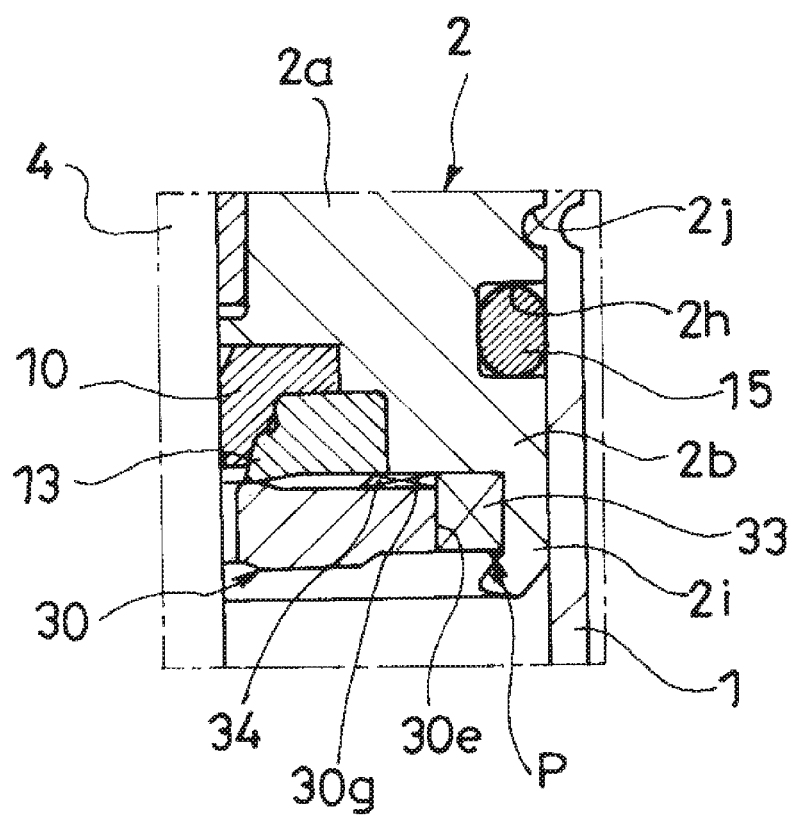
FIG. 5 illustrates a modification of the damper according to the embodiment of the present invention and is a vertical cross-sectional view illustrating the enlarged modified parts.

As illustrated in FIG. 5, an annular groove 2h circumferentially along the outer periphery of the rod guide 2 may be formed. An annular O-ring 15 fitted to this groove 2h may be disposed. Instead of the outer peripheral seal 11c according to the embodiment, this O-ring 15 may prevent the leakage of the hydraulic oil in the cylinder 1. However, this requires forming the groove 2h on the rod guide 2, leading to an increase in processing cost. Further, the dust seal 11b and the O-ring 15, which functions as the outer peripheral seal, need to be individually attached, resulting in complicated assembly work. However, as described above, integrating the dust seal 11b with the outer peripheral seal 11c allows a reduction in processing cost of the rod guide 2, easing the assembly work.

In the embodiment, the rod guide 2 retains the oil seal 10 and the seal holder 13 with the claws 2c.

With the configuration, sliding the rod 4 can prevent the oil seal 10 from being displaced. Additionally, the rod guide 2, the oil seal 10, and the seal holder 13 can be integrated as the rod guide assembly B, easing the assembly work.

It should be noted that, as illustrated in FIG. 5, the following configuration may be applicable. Dispensing with the claw 2c, an annular extending portion 2i extending from the outer periphery of the case 2b to the lower side is disposed. The oil seal 10 and the seal holder 13 are inserted into the case 2b, the seat 30 is inserted into the extending portion 2i, and the lower end of the extending portion 2i is inwardly crimped, thus integrating the rod guide 2, the oil seal 10, the seal holder 13, and the seat 30. In this case, like the embodiment, the rod guide 2 may be hooked to the retaining ring 14. As illustrated in FIG. 5, a groove 2j may be formed on the outer periphery of the rod guide 2 to fit the cylinder 1 to the groove 2j by roll crimping.

In the embodiment, the seat 30 is brought into contact with the rod guide 2. This allows the rod guide 2, a strength member, to receive a load when the rebound cushion 31 is bumped against the seat 30 (hereinafter referred to as a rebound load), ensuring thinning the thickness of the seat 30.

It should be noted that, the seat 30 may be separated from the rod guide 2 to receive the rebound load by the seat 30 alone. However, in this case, the seat 30 needs to be set to have a high strength so as to endure a large load. Furthermore, this needs to secure the seat 30 and the rod guide 2 individually to the cylinder 1, making the structure complicated.

In the embodiment, the inclined surface 2e is formed on the outer periphery of the rod guide 2. The diameter of the inclined surface 2e gradually decreases toward the seat 30 side end (the lower end), and the inclined surface 2e is opposed to the cutout 30e. Additionally, the bottom groove 2f is formed along the radial direction on the seat 30 side (the lower portion) of the rod guide 2. The communication passage P includes the annular passage 20, which is formed between the inclined surface 2e and the cylinder 1, and the lateral passage 21, which is formed between the bottom grooves 2f and the seat 30.

With the configuration, even if the positions of the cutouts 30e and the bottom grooves 2f are not matched, the vertical passage 33, which is formed with the cutout 30e, can communicate with the lateral passage 21, which is formed between the bottom grooves 2f and the seat 30, via the annular passage 20, easing the assembly of the damper A. It should be noted that, as long as the positions of the cutouts 30e and the bottom grooves 2f are matched so as to always ensure the communication between the vertical passage 33 and the lateral passage 21, the annular passage 20 may be dispensed with. Instead of the inclined surface 2e and the bottom groove 2f, the following configuration may be employed. As illustrated in FIG. 5, on the rod guide 2 side of the seat 30 (the upper portion), a lateral groove 30g extending from the cutout 30e to the seat center side along the radial direction is formed. The communication passage P is configured of a lateral passage 34, which is formed between this lateral groove 30g and the rod guide 2, and the vertical passage 33, which is formed of the cutout 30e.

In the embodiment, the cutout 30e is formed on the outer peripheral portion of the seat 30. The communication passage P includes the vertical passage 33 formed of the cutout 30e.

With the configuration, the openings on the communication passage P on the action chamber L side can be close to the outer peripheral side as much as possible, thereby ensuring improving a freedom of design of the rebound cushion 31. It should be noted that, the configuration of the communication passage P and the shape of the seat 30 are not limited to the ones described above. As long as the rebound cushion 31 is configured so as not to overlap the openings on the communication passage P on the action chamber L side, the configurations can be appropriately changed.

In the embodiment, the damper A includes the cylinder 1, the annular rod guide 2, the annular seat 30, the rod 4, the annular oil seal 10, the rebound cushion 31, and the communication passage P. The cylinder 1 internally forms the action chamber L. The rod guide 2 is secured to the upper side (one side) opening of this cylinder 1. The seat 30 is secured to this rod guide 2 on the action chamber L side. The rod 4 is inserted through the inner peripheral sides of the rod guide 2 and the seat 30 so as to be axially movable. The oil seal 10 is held to the inner periphery of the rod guide 2 and slidably in contact with the outer peripheral surface of the rod 4. The rebound cushion 31 is installed to the outer periphery of the rod 4 inserted into the cylinder 1 and bumps against the seat 30 at the most extension. The communication passage P transmits the pressure in the action chamber L to the oil seal 10. The openings on the communication passage P on the action chamber L side (the cutouts 30e) are disposed on the outer peripheral side with respect to the part (the butting portion 30a) of the seat 30 against which the rebound cushion 31 bumps.

Even in the case where the communication passage P passes through the seat 30 and the rebound cushion 31, which is installed to the outer periphery of the rod 4, bumps against the seat 30, the above-described configuration can smooth the surface of the seat 30 receiving the rebound cushion 31 as much as possible. This restrains the damage in the rebound cushion 31, thereby ensuring stretching the rebound cushion 31.

Although the embodiment of the present invention has been described above, the above embodiment is merely an illustration of one application example of the present invention and not of the nature to limit the technical scope of the present invention to the specific configuration of the above embodiment.

The present application claims a priority of Japanese Patent Application No. 2014-103011 filed with the Japan Patent Office on May 19, 2014, and all the contents of which are hereby incorporated by reference.

The invention claimed is:

1. A damper comprising:
   a cylinder that internally forms an action chamber;
   an annular rod guide secured to one side opening of the cylinder;
   an annular seat secured to the rod guide on the action chamber side;
   a rod inserted through inner peripheral sides of the rod guide and the seat so as to be axially movable;
   an annular oil seal held to an inner periphery of the rod guide, the oil seal being slidably in contact with an outer peripheral surface of the rod;
   a rebound cushion installed to an outer periphery of the rod inserted into the cylinder, the rebound cushion bumping against the seat at a most extension; and
   a communication passage configured to transmit a pressure in the action chamber to the oil seal, wherein
   an opening on the communication passage on the action chamber side is disposed on an outer peripheral side relative to a part of the seat against which the rebound cushion bumps, and
   an outer peripheral end of the rebound cushion is located on an inner peripheral side of an inner peripheral end of the opening,
   wherein the communication passage is defined by a groove in an outer peripheral end of the annular seat and an inner surface of the cylinder.

2. The damper according to claim 1, wherein:
   a cutout is formed on the outer peripheral portion of the seat, and
   the communication passage includes a vertical passage formed of the cutout.

3. The damper according to claim 2, wherein:
   an inclined surface is formed on an outer periphery of the rod guide, the inclined surface gradually decreasing in diameter toward the seat side end, the inclined surface being opposed to the cutout, a bottom groove being formed along a radial direction on the seat side of the rod guide, and
   the communication passage includes an annular passage and a lateral passage, the annular passage being formed between the inclined surface and the cylinder, the lateral passage being formed between the bottom groove and the seat.

4. The damper according to claim 2, wherein:
a lateral groove extending from the cutout to the seat center side along a radial direction is formed on the rod guide side of the seat, and
the communication passage includes a lateral passage formed between the lateral groove and the rod guide.

5. The damper according to claim 1, wherein
the seat is in contact with the rod guide.

6. The damper of claim 1, wherein the communication passage is formed in the annular seat to transmit the pressure in the action chamber through the annular seat to the annular oil seal.

7. A damper comprising:
a cylinder that internally forms an action chamber;
an annular rod guide secured to one side opening of the cylinder;
an annular seat secured to the rod guide on the action chamber side;
a rod inserted through inner peripheral sides of the rod guide and the seat so as to be axially movable;
an annular oil seal held to an inner periphery of the rod guide, the oil seal being slidably in contact with an outer peripheral surface of the rod;
a rebound cushion installed to an outer periphery of the rod inserted into the cylinder, the rebound cushion bumping against the seat at a most extension; and
a communication passage configured to transmit a pressure in the action chamber to the oil seal, wherein
an opening on the communication passage on the action chamber side is disposed on an outer peripheral side relative to a part of the seat against which the rebound cushion bumps,
a cutout is formed on the outer peripheral portion of the seat,
the communication passage includes a vertical passage formed of the cutout,
an inclined surface is formed on an outer periphery of the rod guide, the inclined surface gradually decreasing in diameter toward the seat side end, the inclined surface being opposed to the cutout, a bottom groove being formed along a radial direction on the seat side of the rod guide, and
the communication passage includes an annular passage and a lateral passage, the annular passage being formed between the inclined surface and the cylinder, the lateral passage being formed between the bottom groove and the seat.

8. The damper according to claim 7, wherein the seat is in contact with the rod guide.

9. The damper of claim 7, wherein the communication passage is formed in the annular seat to transmit the pressure in the action chamber through the annular seat to the annular oil seal.

10. A damper comprising:
a cylinder that internally forms an action chamber;
an annular rod guide secured to one side opening of the cylinder;
an annular seat secured to the rod guide on the action chamber side;
a rod inserted through inner peripheral sides of the rod guide and the seat so as to be axially movable;
an annular oil seal held to an inner periphery of the rod guide, the oil seal being slidably in contact with an outer peripheral surface of the rod;
a rebound cushion installed to an outer periphery of the rod inserted into the cylinder, the rebound cushion bumping against the seat at a most extension; and
a communication passage configured to transmit a pressure in the action chamber to the oil seal, wherein
an opening on the communication passage on the action chamber side is disposed on an outer peripheral side relative to a part of the seat against which the rebound cushion bumps,
a cutout is formed on the outer peripheral portion of the seat,
the communication passage includes a vertical passage formed of the cutout,
a lateral groove extending from the cutout to the seat center side along a radial direction is formed on the rod guide side of the seat, and
the communication passage includes a lateral passage formed between the lateral groove and the rod guide.

11. The damper according to claim 10, wherein the seat is in contact with the rod guide.

12. The damper of claim 10, wherein the communication passage is formed in the annular seat to transmit the pressure in the action chamber through the annular seat to the annular oil seal.

* * * * *